(12) United States Patent
Sampaio

(10) Patent No.: US 8,841,788 B2
(45) Date of Patent: Sep. 23, 2014

(54) WAVE ENERGY CONVERTER

(76) Inventor: Marcelo Regattieri Sampaio, Rio de Janeiro (BR)

( * ) Notice: Subject to any disclaimer, the term of this patent is extended or adjusted under 35 U.S.C. 154(b) by 427 days.

(21) Appl. No.: 12/970,645

(22) Filed: Dec. 16, 2010

(65) Prior Publication Data

US 2012/0153624 A1    Jun. 21, 2012

(30) Foreign Application Priority Data

Nov. 4, 2010   (BR) .................................. 10004764

(51) Int. Cl.
*F03B 13/16*    (2006.01)
*F03B 13/20*    (2006.01)

(52) U.S. Cl.
USPC .............................................. 290/42; 290/53

(58) Field of Classification Search
CPC .................................. F03B 13/16; F03B 13/20
USPC ........... 290/42, 43, 53, 1 E, 1 C, 1 R; 60/498, 60/497, 501, 495, 505, 502, 496, 500, 60/499; 417/330, 331, 332, 333; 405/75, 405/76
See application file for complete search history.

(56) References Cited

U.S. PATENT DOCUMENTS

| 1,622,173 | A |   | 3/1927  | Bean et al. |            |
|-----------|---|---|---------|-------------|------------|
| 2,911,541 | A | * | 11/1959 | Neufville et al. | 290/4 R |
| 3,231,749 | A | * | 1/1966  | Hinck, III  | 290/53     |
| 3,619,632 | A | * | 11/1971 | Labombarde  | 290/43     |
| 3,870,893 | A | * | 3/1975  | Mattera     | 290/53     |
| 4,110,630 | A | * | 8/1978  | Hendel      | 290/53     |
| 4,149,092 | A | * | 4/1979  | Cros        | 290/54     |
| 4,412,500 | A | * | 11/1983 | Krautkremer | 114/151    |
| 4,481,002 | A |   | 11/1984 | Gargos      |            |
| 7,261,171 | B2 |  | 8/2007  | de la Torre et al. |     |
| 7,305,823 | B2 | * | 12/2007 | Stewart et al. | 60/495 |
| 7,443,046 | B2 | * | 10/2008 | Stewart et al. | 290/53 |
| 7,658,067 | B2 |  | 2/2010  | Gerber      |            |
| 8,062,081 | B2 | * | 11/2011 | Barrett et al. | 440/1 |
| 2005/0126849 | A1 |  | 6/2005 | Pearson et al. |     |
| 2007/0257491 | A1 | * | 11/2007 | Kornbluh et al. | 290/53 |
| 2009/0085357 | A1 |  | 4/2009 | Stewart     |            |
| 2009/0140524 | A1 | * | 6/2009 | Kejha       | 290/54     |
| 2009/0260935 | A1 |  | 10/2009 | Avadhany et al. |   |
| 2009/0311925 | A1 |  | 12/2009 | Hine et al. |            |
| 2010/0228401 | A1 | * | 9/2010 | Hench       | 700/287    |
| 2010/0283249 | A1 | * | 11/2010 | Harden     | 290/53     |
| 2011/0237141 | A1 | * | 9/2011 | Tamba       | 440/3      |

FOREIGN PATENT DOCUMENTS

| WO | 2010/077158 A1 | 7/2010 |
| WO | 2010/080045 A1 | 7/2010 |
| WO | WO 2010/077158 A1 * | 7/2010 |

\* cited by examiner

*Primary Examiner* — Julio C. Gonzalez
(74) *Attorney, Agent, or Firm* — Sughrue Mion, PLLC

(57) ABSTRACT

A Wave Energy Converter (WEC) (70) to be applied in water vehicles (100, 200) and floating bodies (300) is described. The WEC (70) involves a mass-spring-damper system comprising at least one oscillating mass (12), springs (14) at the rate of at least two springs (14) for each oscillating mass (12), said springs (14) being arranged radially to said oscillating mass (12), and at least two power take-off (PTO) devices (13) having different degrees of freedom (DOF). WEC (70) is applied in the motoring and concomitant or alternative energy generation in water vehicles (100, 200) and floating bodies (300). Energy generation is consequent to external disturbances including waves, currents and conventional motoring which results in oscillations in the system containing said WEC (70).

18 Claims, 4 Drawing Sheets

WAVE ENERGY CONVERTER

CROSS-REFERENCE TO RELATED APPLICATION

The present disclosure claims priority from Brazilian Application No. PI 10004764-6 filed on Nov. 4, 2010 which is herein expressly incorporated by reference in its entirety.

FIELD OF THE INVENTION

The present invention belongs to the field of wave energy converters, more specifically, to a wave energy converter for motoring and alternatively or simultaneously for energy generation in water vehicles and floating bodies. The converter uses waves and mechanical disturbances or mechanical disturbances only, arising from wind, currents and in regenerative way from a portion of the conventional motoring energy.

BACKGROUND OF THE INVENTION

The displacement of a surface wave across the ocean yields vertical and horizontal movement of the water, the combination of these movements generating orbital motion of bodies placed on the surface and at some depth. The amplitude of the orbital motion is exponentially reduced with depth, in practical terms motion does not occurring at a depth which is equivalent to half the wave length of the propagation.

Water vehicles are submitted to the actions of waves and currents and also bear the effects of wind which, combined to the drive of the kind of propulsion usually employed, sails or motor, perform complex oscillatory motions made up of horizontal, vertical and rotational components.

Several proposals have been advanced aiming at utilizing wave energy for producing useful work for, among others, the displacement or motoring of water vehicles.

Thus, U.S. Pat. No. 1,622,173, to T. R. Bean et al., is directed to means utilizing the motion of the waves and the kinetic energy of a ship in its rising and falling movements for propelling the ship and driving its auxiliary machinery. To this goal, water turbines enclosed in cylinders are arranged in the ship in such manner as to operate in response to the relative vertical motions of the water and the ship and the oscillatory motions of the turbines are transformed into continuous rotary motion for application to the ship's screws or auxiliary machinery.

U.S. Pat. No. 4,481,002 to Gargos, G. relates to a boat having an external float pivotally fixed to the boat. Through linkage, the motion of the float relative to the boat resulting from wave motion drives a dual cylinder pump. The pump admits water from the body of water in which the boat is suspended and pressurizes that water for direction aft as a means for propulsion.

Published US Application 20050126849 A1 to Pearson, J. B. et al. relates to a selective damping apparatus comprising at least one sensor (7) for detecting, and producing signals indicative of at least the frequency and amplitude of vibrations of a first structural component ("the resonant structure") (6) having one or more resonant frequencies, at least one vibration generator (40) for generating damping vibrations for application to the resonant structure, a controller (8) for controlling the operation of the vibration generator (40) in delayed response to the signals produced by the at least one sensor (7). Contrarily to this publication, the present invention utilizes the concept of absorption of vibrations by making use of a tuned mass-spring-damper system for the utilization of the energy absorbed from the damping in the various components of motion as driving force for vessels and generation of energy in vessels or floating bodies.

Published US Application 20090311925A1 to Hine, R. G. et al. concerns a wave-powered water vehicle which includes a surface float, a submerged swimmer, and a tether which connects the float and the swimmer, so that the swimmer moves up and down as a result of wave motion. The swimmer includes one or more fins which interact with the water as the swimmer moves up and down, and generate forces which propel the vehicle forward. The vehicle, which need not be manned, can carry communication and control equipment so that it can follow a course directed by signals sent to it, and so that it can record or transmit data from sensors on the vehicle. This water vehicle does not employ the tuned mass-spring-damper concept for the propulsion of the water vehicle.

The concept of the Suntory Mermaid II water vehicle involves the wave energy propulsion with the aid of two fins which move upwards and downwards following the waves, this driving the afts. Electric energy for consumption on board the water vehicle is provided by solar panels.

Analogously, the Orcelle concept ship designed for the sea transport of cars manufactured in Europe bound for Australia, besides propellers for propulsion utilizes fins which can also collect energy from waves. Besides other devices as fuel cells, the propulsion of this ship is also aided by sails which are further provided with solar energy collecting devices.

The Suntory Mermaid II as well as the Orcelle concept ship are vessels which do not correspond to the tuned mass-spring-damper concept for the motoring of same. Besides, these ships are provided with outer movable parts for harnessing energy from the wave motion, these parts being exposed to the well-known drawbacks of the harsh marine environment such as corrosion and formation of aggregates of some kinds of microorganisms.

The so-called WEGA—Wave Energy Gravitational Absorber—is a system designed by the Sea for Life Company. According to the International Publication WO 2010/080045 A1, the generating device is intended to harness the energy from the motion of sea waves for the generation of electric power. Said device is comprised of two identical floating bodies with a cylindrical shape (1), which will be exposed to the movement of waves. The two floating bodies are connected by means of arms (2) to a rotary axis (rotary in a plan perpendicular to the sea) (3), this being located on a rotating head (rotating in a plan parallel to the sea) (5), above the (usually predictable) reach of water, and around a mast (6) which is fixed to the sea bed. By action of sea waves, the floating cylinders, which have the buoyancy inherent to their volume and mass, will rise towards the crests and fall towards the troughs. So, an upward and downward circular movement is performed around the axis, where it will be harnessed by a hydraulic of other system (4). All the points which are susceptible of a dynamic seal will operate out of water. It is estimated that the device can harness from 100 to 150 kW of power. The device would at first be applied off shore and designed for producing energy for aquaculture, water desalination, maritime surveillance, tsunami detection, communication platforms, hydrogen production and energy for oil and gas platforms.

It should be pointed out that the system described in this International Publication bears no similarity with the concept of the present invention, which is directed to a tuned mass-spring-damper system having more than one degree of freedom (DOF) and tuned for the optimized utilization of the oscillations. Further, the device described in this International Publication is directed to the generation of energy solely, while the wave energy converter (WEC) which is the object of the present Application is directed to the motoring of vessels and on board energy generation, besides the generation of energy to land with more degrees of freedom for collecting the waves' energy.

Dampers which harness energy resulting from the relative movement of the suspension system of a vehicle such as an automobile are well-known.

Thus, Published US Application 20090260935 A1 to Avadhany, S. et al. relates to a regenerative shock absorber, that is, the shock absorbers harness the energy resulting from the relative motion of the suspension system of a vehicle. To this end, a piston is disposed for reciprocating motion within a cylinder as a vehicle's suspension system deflects. Hydraulic fluid passes through a hydraulic motor to turn its shaft. The hydraulic motor shaft is connected to an electric generator to generate electricity. Flow characteristics of hydraulic circuits are selected to provide suspension system damping for appropriate wheel control.

The energy removed from a conventional suspension system is lost as heat. There are known systems which try to recover the energy of a suspension system. For example, U.S. Pat. No. 7,261,171 to De La Torre, L. A. et al. shows an apparatus and its method of operation which convert relative movements between a vehicle wheel and a body of the vehicle to electricity that is used to recharge a battery of the vehicle. The apparatus includes a generator provided on the vehicle and a linear motion to rotary motion converter that is connected between a wheel of the vehicle and an armature of the generator. Reciprocating movements of the wheel relative to the vehicle body are converted by the motion converter to rotations of the armature in the generator which produces electricity for recharging the battery of the vehicle.

The concept of the present invention is patentably distinguishable from the previous and other references directed to energy converters in vehicles in that it is to be applied in water vehicles and floating bodies, but also for i) being not only regenerative, ii) include articulated external mobile parts which contact water as an option only and iii) do not include external parts designed for absorbing movement such as is the case of terrestrial transportation on wheels and suspension system.

The mandatory use of external, articulated mobile parts also occurs in the concept vehicles cited hereinbefore—Suntory Mermaid II and Orcelle—as fins, in this case the systems are not only regenerative.

A further, main distinction of the present Application includes the fact that the oscillating mass-spring-damper system of the converter of the invention bears more than one degree of freedom (DOF) of motion, so, when the WEC containing it is placed in a water vehicle or floating body, besides allowing the utilization of horizontal and vertical oscillations, it also makes possible the utilization of rotational oscillations.

Advantageously, the said mass-spring-damper system can also be automatically tuned for the optimization of the utilization of the energy of incident movements.

U.S. Pat. No. 7,443,046 to D. B. Stewart relates to a wave energy converter (WEC) which includes a shell suitable for being placed within a body of water. The shell contains an internal oscillator comprising a "reaction mass" and a spring mechanism coupled between the reaction mass and the shell. The shell and internal oscillator are constructed such that, when placed in a body of water and in response to waves in the body of water, there is relative motion between the shell and the internal oscillator's mass. A power take-off (PTO) device is coupled between the internal oscillator and the shell to convert their relative motion into electric energy. In systems embodying the invention, the spring mechanism is designed such that its displacement or movement is less than the displacement or movement of the reaction mass. Contrary to the concept of the present Application, the system described in this U.S. patent makes use of the mass-spring-damper concept for generating energy only, besides considering only one axis for the movement of the oscillating mass in the interior of the float, which limits the utilization of the energy in other dimensions of movement.

Published U.S. Application 20090085357 A1 to D. B. Stewart relates to a wave energy converter (WEC) system similar to that of U.S. Pat. No. 7,443,046 cited above. The WEC depicted in this document includes a shell containing an internal oscillator comprised of a reaction mass suspended from the shell by an elastic spring in parallel with a constant force spring. The constant force spring provides a relatively constant force (Fc) to counterbalance the static weight of the reaction mass and reduce the extension "static" length of the elastic spring while the elastic spring exerts a force ($F_{es}$) on the reaction mass that is proportional to the displacement, x, of the elastic spring. A power take-off (PTO) device, located within the shell, coupled between the shell and the internal oscillator converts their relative motion into electrical energy. Although this technology makes use of two springs in opposition, the configuration proposed bears only one degree of freedom, since the working mass moves along one single axis.

International Publication WO 2010/077158 A1 relates to a WEC which is the mechanical equivalent to a fully balanced 3-phase electrical generator, aimed to produce continuous power. By virtue of its 3-phase mechanic architecture, the WEC reacts force against himself and doesn't need any mooring system to react force against. The WEC is characterized by three equal legs (12,13,14), which are the three individual mechanical phases, all of them connected to a central articulation (1). The angle between each mechanical phase/leg (12,13,14) centre of mass (2,3,4) is exactly 120° degrees. Each leg/phase (12,13,14) must have the same inertia moment and is characterized by an equal large rigid mass (22,23,24) connected to each leg/phase (12,13,14). Only one of the three masses (22,23,24) interferes with Ocean waves, being the other two deeply submerged. Each leg/phase is connected by one of three equal springs (5,6,7) and one of three equal power-take-off dampers (8,9,10).

The WEC object of this International Publication is directed solely to the generation of energy, the propulsion of water vehicles being not included in the scope of this Publication. Such as described in the above document, the proposed device could not make possible the propulsion of a water vehicle. Besides, the described system operates in a condition of immersion in water, which means it is subject to corrosion and formation of aggregates of microorganisms. Further, the oscillating orbital movements described therein are limited to a single plan of vibration, which restricts the simultaneous utilization of the energy in further dimensions of movement. On the contrary, the radial arrangement of the present invention provides movement in all dimensions.

U.S. Pat. No. 7,658,067 to J. S. Gerber relates to a tunable WEC system where one or both of the floats used in the WEC has an internal spring system including a weight suspended from a spring mechanism having a selectively variable spring constant for allowing vertical oscillations of the weight in response to bobbing motions of the float The mechanical impedance of the system is a function of the oscillations of the weight, hence the system is tunable to selected values of mechanical impedance for optimal coupling with the prevailing waves.

The energy generation system described in the said U.S. document is applicable to floating bodies alone, the application of same for the propulsion of water vehicles being not considered in the U.S. Pat. No. 7,658,067. Further, only one axis of movement of the oscillating mass belonging to the float is provided, this feature restricting the utilization of the available energy in other dimensions of movement.

Thus, it is of interest to make available a WEC to be applied for i) the propulsion of water vehicles and simultaneous or alternate energy generation in these same water vehicles; ii) the generation of energy in floating bodies, the wave energy being that of waves themselves or any other incident mechanical disturbances, the WEC comprising a mass-spring-damper having different degrees of freedom (DOF) and automatic or manual tuning so as to maximize the energetic utilization of the oscillations within the limits of safety. WECs comprising more than one oscillating system are also envisaged, the operation being optimized for different oscillating conditions.

SUMMARY OF THE INVENTION

Broadly, the instant invention is directed to a WEC based on a mass-spring-damper system having different degrees of freedom (DOF) in the three translational directions and three rotational dimensions, the WEC being applied for i) the propulsion of water vehicles and simultaneous or alternate energy generation in these same water vehicles; ii) the generation of energy in floating bodies, the wave energy being that of waves themselves or any other incident mechanical disturbances.

The present WEC based on a mass-spring-damper system having different degrees of freedom comprises an inertial oscillating mass-spring-damper set included in a housing, said inertial system comprising:

a) at least one oscillating mass, b) springs, at the rate of at least two springs for each oscillating mass, the said springs being positioned radially relative to the said oscillating mass, and c) at least two power take-off (PTO) energy devices, at the rate of one power take-off energy device for each spring, one of the ends of said PTO devices being connected radially via universal joints to at least one oscillating mass while the other end of said PTO device is connected, also via universal joints to the wall of said housing, said PTO devices being selected among hydraulic, pneumatic and hydropneumatic work cylinders and linear generators to collect the mechanical energy from the oscillating mass-spring system, and channel said energy to an energy storing conventional system.

Thus the oscillations resulting from the hitting of external disturbances including waves and wind on the system containing said WEC are channeled to the said oscillating mass-spring system.

The stored energy is then utilized in water vehicles for propulsion and simultaneous or alternative energy generation.

Alternatively the stored energy can be employed for the generation of energy in floating bodies.

According to one mode of the present WEC the stored energy is connected to an engine, a generator and other state-of-the-art technique for the propulsion of water vehicles.

According to an alternative mode of the present WEC related to water vehicles, all or a portion of the stored energy is utilized for generating the energy required to the water vehicle as electrical energy.

According to a further alternative mode of the present WEC related to the propulsion of water vehicles, the mass-spring-damper system comprises one mass, one spring and one power take-off (PTO) device.

According to an additional alternative mode of the present WEC related to water vehicles, the stored energy is channeled to the continent.

According to another mode of the present WEC, the stored energy is connected to an energy-transmission cable and other known devices for energy generation in a floating body.

Thus, the present invention provides a WEC based on a mass-spring-damper system having different degrees of freedom (DOF) where the energy of waves is channeled to said mass-spring-damper system and then to an energy storage system.

The invention provides further a WEC based on a mass-spring-damper system having different degrees of freedom (DOF) for the propulsion of water vehicles.

The invention provides also a WEC based on a mass-spring-damper system having different degrees of freedom (DOF) for the total or partial generation of energy of a water vehicle.

The invention provides still a WEC based on a mass-spring-damper system having different degrees of freedom (DOE) where said WEC is able to provide all the propulsion required for the water vehicle. Alternatively the WEC is combined or hybridized to conventional motoring devices including diesel, diesel-electrical or sailboats, during all or part of the path to be covered by the water vehicle.

The invention provides still an on board WEC based on a mass-spring-damper system having different degrees of freedom (DOF) to be utilized in the motoring of water vehicles, the WEC being free of any contact with the surrounding water.

The invention provides also a WEC based on a mass-spring-damper system having different degrees of freedom (DOE) with automatic adjustment of conventional external stabilization devices including hydrofoils so as to optimize the utilization of the oscillations energy with safety.

The invention provides further a WEC based on a mass-spring-damper system having different degrees of freedom (DOF) to be utilized in the motoring of water vehicles, the WEC being added of external hydrofoils which aid in the optimization of the mechanical impedance of the system for optimum coupling to the waves.

The invention provides still a WEC based on a mass-spring-damper system having different degrees of freedom (DOF) which is able to generate internal and external energy (bodies of water and land) for pumping. Alternatively, said WEC is applicable to the interconnected or isolated production of electricity or heat.

The invention provides also a WEC based on a mass-spring-damper system having different degrees of freedom (DOF) which is positioned at the bow, the stem or any other position in a water vehicle so as to optimize the utilization of the oscillations from waves, wind and conventional motoring utilized in the three translational dimensions and the three rotational dimensions with safety.

The invention provides further a WEC based on a mass-spring-damper system having different degrees of freedom having different degrees of freedom (DOE) which is able to associate several units of said WEC in modules for operation in series, in parallel or a combined arrangement in series and parallel so as to boost the capacity of the resulting WEC system.

The invention provides also a WEC based on a mass-spring-damper system having different degrees of freedom having different degrees of freedom (DOF) in a water vehicle operating on the surface of a body of water.

The invention provides equally a WEC based on a mass-spring-damper system having different degrees of freedom in a water vehicle operating in the submersed mode.

The invention provides also a WEC based on a mass-spring-damper system having different degrees of freedom having different degrees of freedom (DOF) to be utilized for the generation of energy in a floating submersible body.

The invention provides also a WEC based on a mass-spring-damper system having different degrees of freedom having different degrees of freedom (DOE) to be utilized for the generation of energy in a floating body operating on the surface of a body of water.

The invention provides also a WEC based on a mass-spring-damper system having different degrees of freedom having different degrees of freedom (DOF) to be utilized for the generation of energy in a floating body containing an automatic adjustment mechanism for the dimensions or ballast of same for tuning of the resonance frequency of the waves and optimized utilization of the energy and then channeling said energy to the continent by conventional means.

The invention provides additionally a WEC based on a mass-spring-damper system having different degrees of freedom having different degrees of freedom (DOE) to be utilized for the generation of energy in a floating body forming a set of several floating bodies containing said WEC.

It is predicted that the installation of the WEC according to the invention is to be performed during: i) the manufacturing of the water vehicle or floating body; ii) the adaptation of a conventional water vehicle or floating body for receiving the WEC; or still, the WEC is installed in modules in standardized transportation structures including containers, this making it easier to utilize said WEC in modules. In all cases the WECs should be attached in the interior of the water vehicle or floating body so as to allow the correct and safe working of the invention.

BRIEF DESCRIPTION OF THE DRAWINGS

FIG. 3 attached is a schematic illustration of a WEC of the invention in a configuration of floating body or submerged structure for the generation of electrical energy alone or connected to the energy network. FIG. 3A shows one mode of an energy-generating floating or submersed body while

FIG. 7 attached is a schematic illustration of a kind of path undergone by the mass included in the WEC of the invention which is close to a three-dimension Lissajous figure.

DETAILED DESCRIPTION OF THE INVENTION

Figure 1:
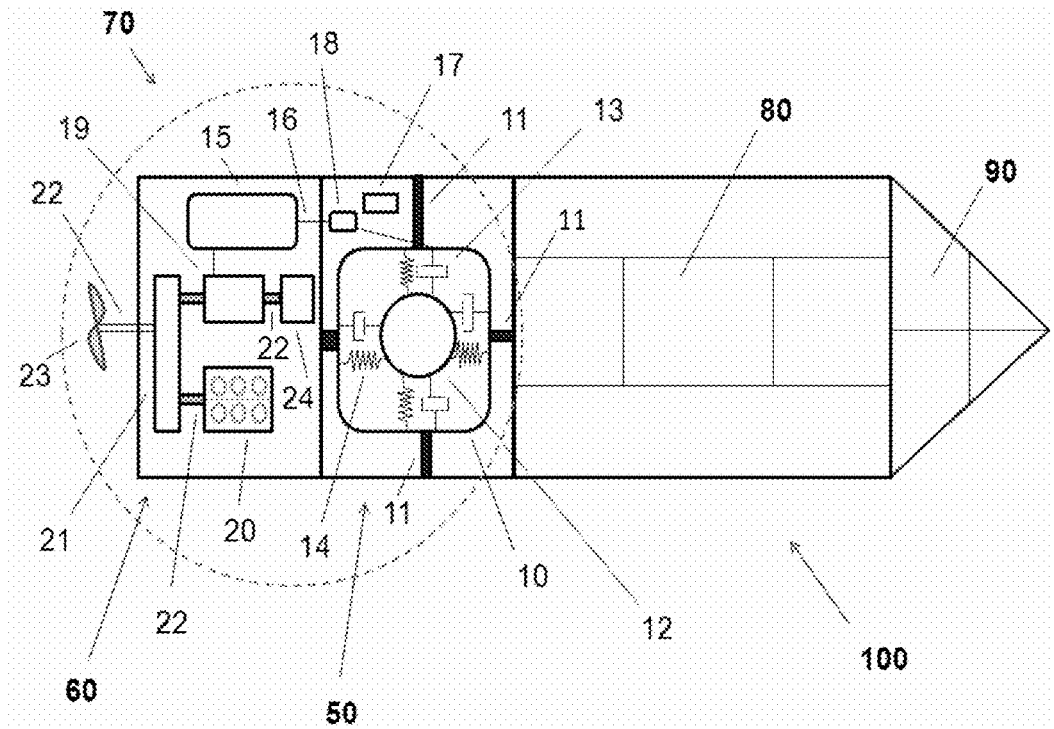
FIG. 1 attached is a schematic illustration of a WEC of the invention in a configuration of the kind of a maritime vehicle with added motoring for a single axis by means of known mechanisms such as a combining gearbox.

According to the invention, the following terms have the meanings stated below:

"Bodies of water" means seas and oceans, bays, lakes and rivers.

"Floating bodies" means floats, platforms and rafts.

The present invention is therefore directed to a WEC based on a mass-spring-damper system having different degrees of freedom (DOF) for motoring and simultaneous or alternative generation of energy in water vehicles and floating bodies. The observed energy conversion is consequent to external disturbances including waves, currents and wind and conventional motoring which result in oscillations in the system containing the energy converter, where the said WEC belongs to a water vehicle or a floating body.

According to one mode of the invention, the WEC based on a mass-spring-damper system having different degrees of freedom (DOF) is mainly directed to water vehicles, more specifically to water vehicles which do not cut waves.

According to the mode of the invention to be utilized in water vehicles the WEC is also used for generating energy. Still according to this mode, the proposed WEC is utilized in the motoring and in the full or auxiliary generation of energy for the water vehicle.

According to another mode of the invention the WEC is an energy generator in a floating body, the energy generated being utilized in bodies of water.

In an alternative mode of the WEC in a floating body, the energy generated is channeled to the continent by state-of-the-art means and devices for energy transmission for connection to the energy network or isolated installation.

In still another alternative mode of the WEC in a floating body, the generated energy is partially utilized in the body of water and partially channeled to the continent.

The concept of the present WEC involves an oscillating inertial mass-spring-damper system with degrees of freedom (DOF) in the three translational and three rotational dimensions of movement, said WEC being able to collect and store the energy of waves and channel it to a conventional energy system, including applications in motoring of water vehicles and generation of energy, the generation of energy being utilized in the water vehicle.

Alternatively, the generated energy is utilized in floating bodies.

The WEC of the invention is used either as the only motoring device of the water vehicle or it can provide a portion of the energy required for the displacement, the working of the WEC being variable during the path developed by the water vehicle according to the ocean waves, winds and currents it meets.

The mass-spring-damper of the WEC of the invention comprises at least one oscillating mass, which can be spherical but admitting any other geometry. The oscillating mass is manually or automatically variable according to the operation conditions.

The oscillating mass comprises pieces, parts and aggregates, including a hollow body which can be filled with grains, comminuted solids and fluids in general.

The mass-spring-damper set is boarded ready to use.

Alternatively the set is mounted in the system where it is to be utilized, either water vehicle or floating body.

The oscillating mass comprises between 2 and 20 percent of the total weight of the WEC, with amounts higher than 50% in the case of its utilization in floating bodies.

In a patentably distinguishing way, the concept of the present WEC involves coupling to the oscillating mass at least two springs and two power take-off (PTO) devices, the springs being placed radially relative to that mass, so as to provide the desired effect of several degrees of freedom (DOF), that is, three translational dimensions and three rotational dimensions.

The mass-spring-damper set of the invention comprises further at least two power take-off (PTO) devices selected among hydraulic, pneumatic and hydropneumatic cylinders and linear electrical generators. The PTOs correspond to the dampers of the system.

The oscillating mass is connected via universal joints to the said power take-off (PTO) devices.

The oscillating mass is positioned inside a housing.

Alternatively, the oscillating mass is positioned outside said housing.

Universal joints or couplings are state-of-the-art devices selected among cardan joints, homokinetic joints and flexible joints.

Every hydraulic and/or pneumatic cylinder and/or electrical generator is associated to a spring (or bundle of springs) selected among mechanical, pneumatic, gas and magnetic springs.

The spring (or bundle of springs) is contained in the interior of the housing.

Alternatively, the spring (or bundle of springs) is positioned outside said housing.

Every hydraulic and/or pneumatic cylinder and/or electrical generator is connected, also by universal joints, to the structure or housing which protects the WEC system.

In case there is the option to use a bundle of springs, those admit to be associated in series, in parallel or in a series-parallel combination.

Each spring or bundle of springs of the mass-spring set is associated to at least one power take-off (PTO) device selected among hydraulic, pneumatic and hydropneumatic cylinders and linear electrical generators, isolated or combined in any desired way.

The mass-spring-damper system utilized in the WEC of the present invention is lodged in a housing designed to protect the components of said WEC.

Alternatively said housing is subdivided so as to separately place the WEC components.

The housings on their turn are attached to the compartment of the water vehicle or floating body by means of any known fixation device. In this way the mass-spring-damper system keeps sheltered from the body of water.

Alternatively the WEC of the invention operates in combination with conventional systems including hydrofoils for the stabilization of water vehicles and adjustable external rods for floating bodies for the optimization of the collection of waves' energy with safety.

In order to be utilized for the propulsion of the water vehicle, the energy received by the mass-spring-damper system should be channeled to a conventional storage energy system. This is obtained by the use of cables, electrical pipes, control valves or the like, connected to an energy storage system.

Advantageously, the concept of the invention involves further a device provided with a control mechanism for manual or automatic tuning of the resonance frequency of the waves and optimization for extraction with safety of the highest possible amount of energy from the incident disturbances.

The device which performs such control is selected among the state-of-the-art automatic control mechanisms, including those which are employed in Tuned Mass Dampers (TMD) in engines and structures including buildings, bridges and towers. The concept of employing TMDs as a way of collecting mechanical vibrations and protecting structures and dissipating these outer oscillations undergone by structures is generally well known. In this way, from a control signal originating from sensors which can be triaxial accelerometers or the like, the system will process the signal and work by feedback to one or more parameters which influence the resonance frequency or transfer function of the mass-spring-damper system (e.g., k—spring constant, m—value of the oscillating mass or b—damping constant). The parameters will then be adjusted so as to make possible the maximum power transfer of the disturbances including waves, currents and winds to the water vehicle or floating body, within safety requirements.

The energy storage system designed to store the energy collected by the mass-spring-damper system is selected among pneumatic, hydraulic, hydropneumatic, chemical and inertial systems.

Alternatively, said energy storage system is made up of superconductive coils (SMES—Superconducting Magnetic Energy Storage).

The stored energy should then be channeled to a pneumatic, hydraulic or electrical engine, for the motoring of the water vehicle and then to an auxiliary electrical generator for the water vehicle or provision to the continent.

According to the WEC of the invention directed to the motoring of water vehicles the engine on its turn is associated to a coupler for hybrid motoring which on its turn is connected to i) a propeller and ii) a conventional water vehicle engine or turbine.

Alternatively, the coupler for hybrid motoring is dispensed with and the pneumatic (or other) engine is directly coupled to a propeller or the like, another propeller being coupled to the conventional engine or turbine of the water vehicle.

Alternatively the electric engine is directly connected to the propeller or electrical generator for the actuation of azimuth propulsion thrusters.

Therefore, according to the WEC of the invention based on a mass-spring-damper of different degrees of freedom (DOF) and automatic or manual tuning, the motion of waves or any other mechanical disturbance incident on the water vehicle or floating body causes the movement of the oscillating mass-spring-damper system lodged in the said housing.

The WEC of the invention, whenever employed in a configuration or mode of floating body involves channeling the energy stored and generated to cables connected to the continent.

Alternatively, said cables provide with energy a maritime apparatus selected among an off-shore petroleum exploration platform or the like.

The floating body is provided with conventional bracing and anchoring systems.

According another mode of the invention, the WEC lodged in a floating body is provided with trellises, rods or telescopic joints designed to increase the dimensions of the floating body either in the horizontal or the vertical dimension for optimized tuning to the frequency of the incident waves.

The trellises, rods or telescopic joints are connected to the mass-spring-damper system through hydraulic, pneumatic or electrical servomotors.

Still, the WEC lodged in a floating body envisages an arrangement of several connected floating bodies, so as to provide a higher amount of energy in a set of dimensions fixed or adjustable to the frequency of the incident waves.

As regards the mathematical modeling of the present WEC, in a simplified way, when envisaging a linear oscillator with a damping constant which is proportional to the speed and spring constant proportional to the shift and subject to only one harmonic oscillation occurring in the horizontal dimension "x" (in spite of having already pointed out that the system allows the utilization of the oscillations in various dimensions), the following equation is presented for the motion:

$$m\frac{d^2x}{dt^2} + b\frac{dx}{dt} + kx = Fx_o\cos(\omega t)$$

F(t)=$Fx_o \cos(\omega t)$=External periodic force.
$Fx_o$=Maximum Amplitude of the Force.
b=Atrition Coefficient or oscillating system energy withdrawal factor.
k=Spring Constant.
$\omega = 2\pi f$=Angular Frequency of the applied force $$\omega_o = \left[\frac{k}{m}\right]^{\frac{1}{2}} = \text{Natural oscillating frequency of the system.}$$

$\gamma = b/2m$

Solution for the position, speed and power:

$$x = \frac{Fx_0}{m} \frac{1}{[(\omega_0^2 - \omega^2)^2 + 4\gamma^2\omega^2]^{\frac{1}{2}}} sen(\omega t + \theta);$$

Maximum for: $\omega = (\omega_o^2 - 2\gamma^2)^{\frac{1}{2}}$ $$v = \frac{Fx_o}{m} \frac{\omega}{[(\omega_o^2 - \omega^2)^2 + 4\gamma^2\omega^2]^{\frac{1}{2}}} \cos(\omega t + \theta);$$

Maximum for: $\omega = \omega_o$ $$\langle P \rangle = \frac{Fxo}{m} \frac{\gamma\omega^2}{[(\omega_o^2 - \omega^2)^2 + 4\gamma^2\omega^2]^{\frac{1}{2}}};$$

Maximum for: $\omega = \omega_o$

By defining the multiplication factor, $$M = \frac{\omega_o}{\left[\left(1-\left(\frac{\omega}{\omega_o}\right)^2\right)^2 + \left(\frac{2\gamma}{\omega_o}\right)^2\left(\frac{\omega}{\omega_o}\right)^2\right]^{\frac{1}{2}}}$$

Figures 5, 6:
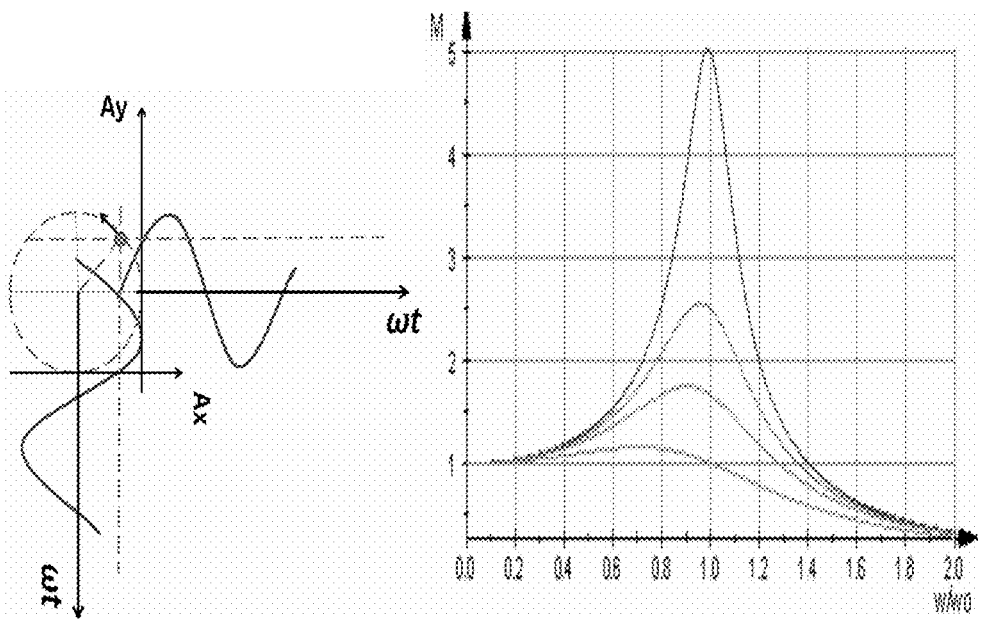
FIG. 5 attached are graphs representing the decomposition in the vertical-y and horizontal-x of the orbital motion described by bodies located on the surface and at some depth of a body of water.
FIG. 6 attached shows a family of curves for different damping factors for the ideal case of a one-dimension dampened harmonic oscillator submitted to an external sine force.

Thus it is possible to obtain the curves illustrated in FIG. 6 for the several damping values b.

The present invention will be described now in relation with the attached Figures. However it should be clear for the experts that the described configurations are intended for illustrative purposes only, and that they admit many variations and modifications, all of them being comprised in the scope of the present invention, the scope being limited solely by the attached claims.

As illustrated schematically in FIG. 1, (100) depicts a water vehicle, preferably of the kind which does not cut waves, but not exclusively.

The inventive WEC, generally designed by numeral (70), solely for illustrative purposes is positioned close to the stern of a water vehicle (100). There are still in this Figure: a load compartment (80) which can be modified for placing said WEC and the bow (90) of said water vehicle (100) which can also lodge said WEC, which even farther away from the engine room is not hindered from channeling the energy from same by means of cables or electrical pipes.

As mentioned above in the present specification, the location of WEC (70) in the structure of water vehicle (100) is any, at the stern, the bow or at an intermediary location of the structure of said water vehicle (100).

Alternatively, the WEC (70) of the invention is included in a modular structure to be embarked and attached conveniently as in the case of the conditioning of the WEC in containers.

According to FIG. 1, the mass-spring-damper system designed to collect the energy from i) the oscillations or disturbances from the waves, winds and currents which attain the water vehicle (100) in a combined way, and ii) conventional propulsion in a regenerative way, is contained in a housing (10).

Housing (10) is attached to section (50) of water vehicle (100) by means of any fixation means (11).

Mass (12) will provide the required working mass upon operation of the system. The at least one mass (12) is illustrated as spherical for the sake of simplicity, but it admits any geometry including cylindrical and cubic geometries.

The oscillating mass (12) is made up of pieces, parts and aggregates.

Alternatively, mass (12) corresponds to a hollow compartment for filling with liquids, fluids or grains of any nature. This mode allows the variation of mass (12) under controlled and automatic way or only automatic for the resonance or emptiness for maintenance or shutting off of the system where said WEC (70) is inserted, including a water vehicle or floating body.

Thus the variation of the value of mass (12) allows the optimized tuning of the mass-spring-damper system to the frequency of incident waves.

Mass (12) is connected by means of universal joints (9) selected among cardan joints, homokinetic joints and flexible joints (see FIG. 4) to at least one power take-off (PTO) device (13), selected among hydraulic, pneumatic or hydropneumatic cylinders and/or linear electrical generators from where useful energy is extracted from the system.

Each of these power take-off devices (13) is inserted in or coupled to at least one spring (14), forming mass-spring-damper systems which in turn are attached, also by means of universal joints (9), to said housing (10) to receive the mechanical energy of the mass (12) put into motion by the energy of waves and other disturbances incident on said mass-spring-damper system of the water vehicle (100).

In this way, the energy of the mass-spring-damper system is received, being utilized after channeling and storage for total or partial propulsion of a water vehicle or generation of energy in the water vehicle or in floating bodies.

Contrarily to the principles of the invention, in state-of-the-art mass-spring-damper systems the energy resulting from the external disturbance is lost as occurs in Tuned Dynamic Dampers devices normally used for vibration absorption in engines, motors, oscillations produced by winds and earthquakes in buildings, bridges, towers and other structures. In other cases the generated energy is utilized only in one axis of movement of oscillating body positioned in the interior of vehicles or in the interior of floating bodies. Further, at present the energy resulting from spring-damper systems is not used for the motoring of water vehicles.

The energy received in the power take-off (PTO) devices (13) should then be channeled to a system (15) of energy storage.

The channeling of energy is performed with the aid of control valves (18) or similar devices. Control valves (18) are connected to system (15) by means of pipes (16) for draining of the working fluid or by electrical conducting devices in the alternative of employing linear electrical generators.

Still, a device (17), selected among a set of sensors, hardware and software, servomechanisms, valves and the like is provided, such device being provided with a control mechanism for manual or automatic tuning of the waves resonance frequency and/or optimization of the utilization of the energy arising from the incident disturbances.

The energy stored in (15) should be turned into propulsion for the water vehicle (100), so the same is directed to a motor (19). One end of motor (19) is connected, via working shafts (22) to a coupler (21) for hybrid motoring and the other end of said motor is connected to an auxiliary electrical generator (24). On its turn coupler (21) is connected, also via working shafts (22) to a propeller (23) and to a water vehicle conventional motor (20).

Devices (15), (16), (19), (20), (21), (22), (23) and (24) are all state-of-the-art items and are lodged or accommodated in a section (60) of the water vehicle (100).

As cited above in the present specification, it is not mandatory that sections (50) and (60) be contiguous in water vehicle (100).

In all cases, the channeling of the energy of device (13) to device (15) will be performed as required, covering a shorter or longer path in the water vehicle or floating body, so as to allow the association in series, in parallel or a combination of same, of several devices used in the invention, summing and channeling the energy of each unit by means of pipes or electrical conducting devices, additively or alternatively utilizing available means to the experts.

Figure 2:
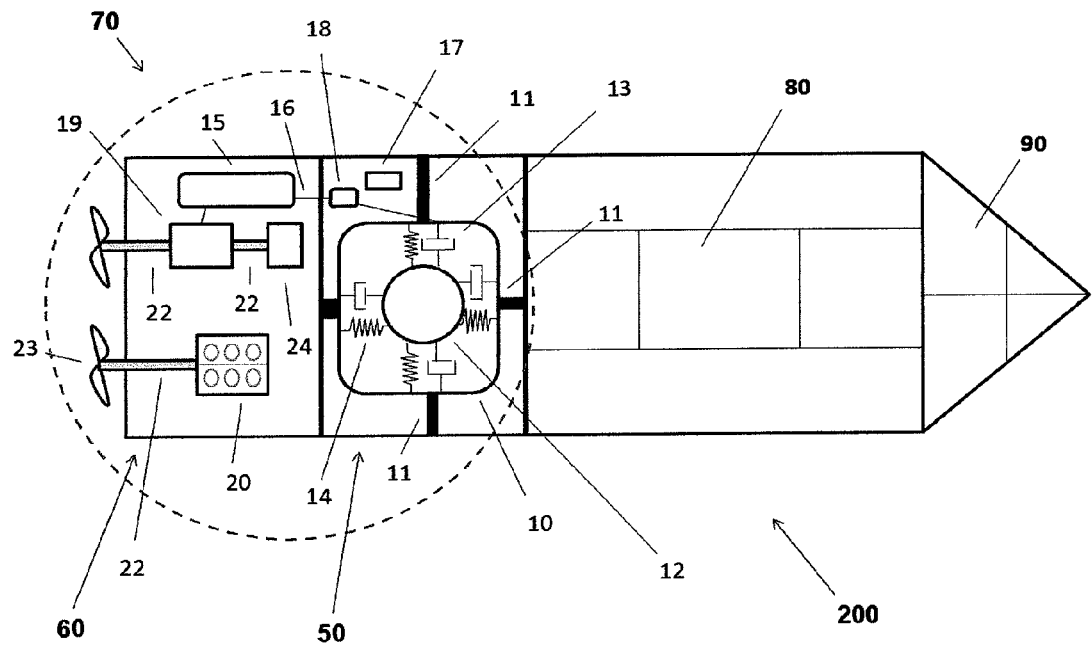
FIG. 2 attached is a schematic illustration of a WEC of the invention in a configuration of the kind of a maritime vehicle with motoring for independent axes (without efforts adder).

FIG. 2 is a schematic illustration of another mode of the WEC (70) of the invention included in a water vehicle (200).

In this mode only the arrangement of conventional energy utilization devices contained in section (60) was altered, while the mass-spring-damper system of the invention contained in housing (10) is identical to that described as per FIG. 1.

Thus, the energy stored in (15) is transferred to a motor (19). Motor (19) is connected, via working shafts (22), through one end to a first propeller (23) and through the other end, to an auxiliary, optional, electrical generator (24). In an independent way, a second propeller (23) is connected, via a working shaft (22), to a conventional motor or turbine (20) normally used in water vehicles.

In the option where the WEC (70) is utilized for the total or partial energy generation of the water vehicle, generation is performed with the aid of electrical generator (24).

Figure 3A:
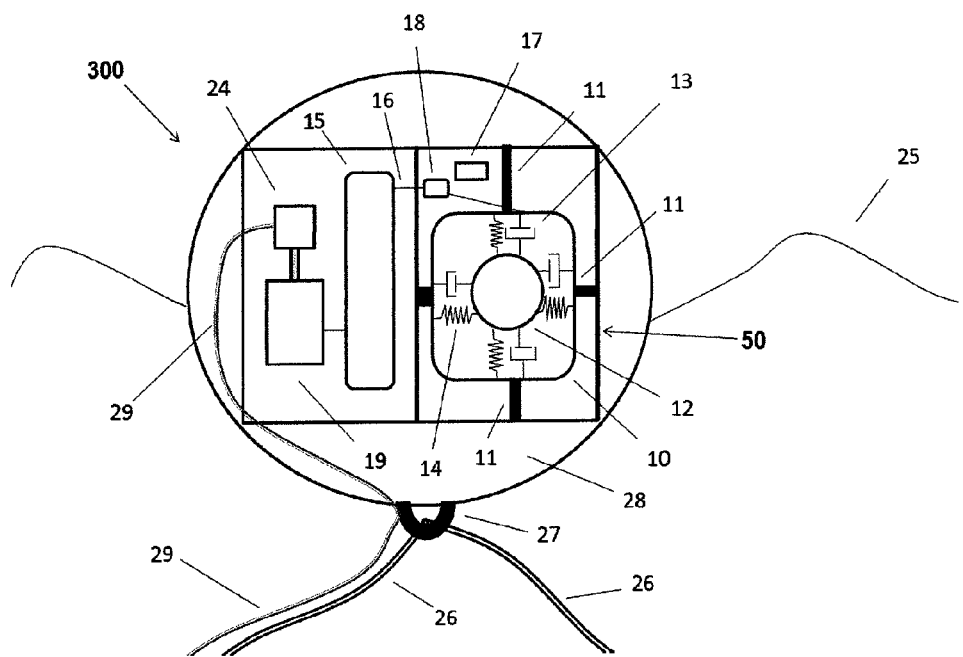
Figure 3B:
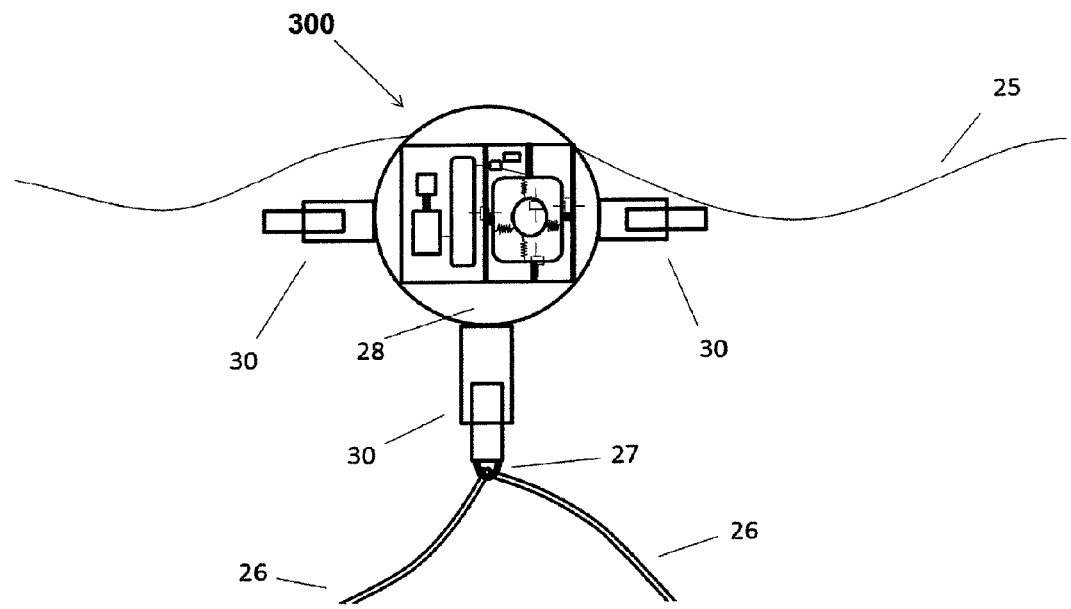
FIG. 3B shows another mode of an energy-generating floating or submersed body provided with adjustable rods and FIG. 3C, a set of connected several floating bodies of the kind of those of FIGS. 3A and 3B separated by fixed or adjustable distances.
Figure 3C:
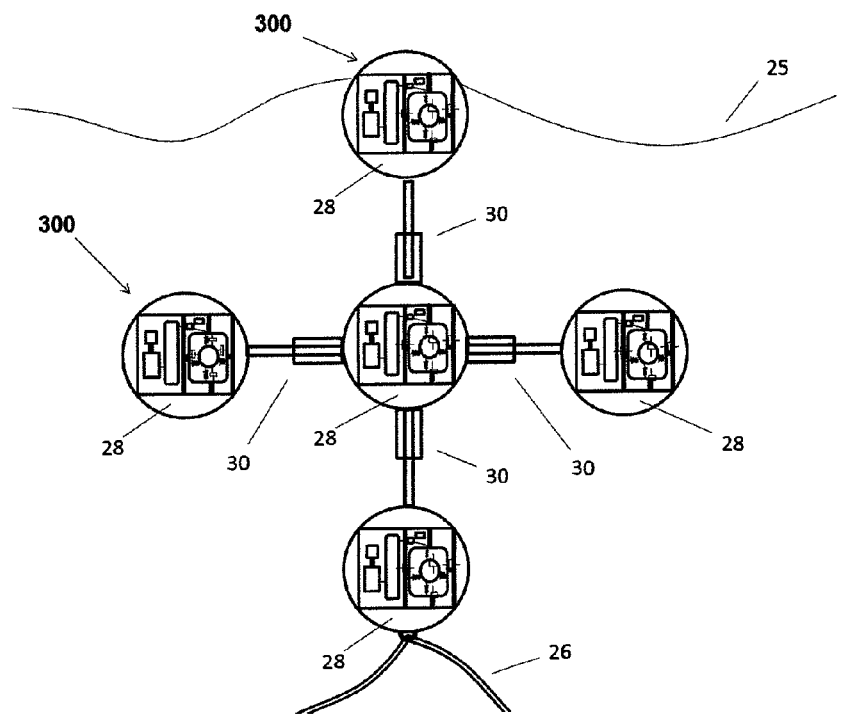

FIGS. 3A, 3B and 3C illustrate the WEC (70) of the invention as applied to a floating body (300) for energy generation.

According to one mode, the floating body (300) is positioned on the surface (25) of the body of water.

According to another mode, the floating body (300) is immersed in the body of water.

In FIGS. 3A, 3B and 3C numerals refer exactly to the same items as those described for the preceding Figures.

It is noted from the Figures that in view of the reduced dimensions of the floating body, the WEC occupies practically all the inner space of the floating body.

It should be pointed out that although the mode of WEC utilized in water vehicles (100, 200) and that used in a floating body (300) includes in one case one or more propellers and in another case the absence of propellers, the WEC of the invention is designed in all cases by general numeral (70) relative to the mass-spring-damper system with various degrees of freedom (DOE) and energy storage system.

According to FIG. 3A, the WEC (70) of the invention whenever applied to a floating body (300) configuration involves channeling the energy stored in (15) and generated in (24) to cables (29) connected to the continent. Alternatively, cables (29) provide a platform or any other maritime equipment (not represented) with energy.

Floating body (300) is provided with anchoring system (26) attached to a mooring strap (27) belonging to said floating body.

According to the invention mode illustrated in FIG. 3B, the WEC (70) included in floating body (300) is provided with devices (30) selected among fins, trellises or telescopic joints, designed to increase the dimensions of converter (70) included in a floating body (300). The increase is in the horizontal or vertical dimension for the optimized tuning to the frequency of incident waves.

Floating body (300) is provided with a ballast compartment (28) the filling of which is automatically controlled, allowing optimized tuning to the frequency of incident waves.

FIG. 3C illustrates a mode of the WEC (70) where several floating bodies (300) are connected to optimize the energy supply in a set of dimensions which are fixed or adjustable to the frequency of incident waves. The connection between floating bodies (300) is made with the aid of devices (30).

Figure 4:
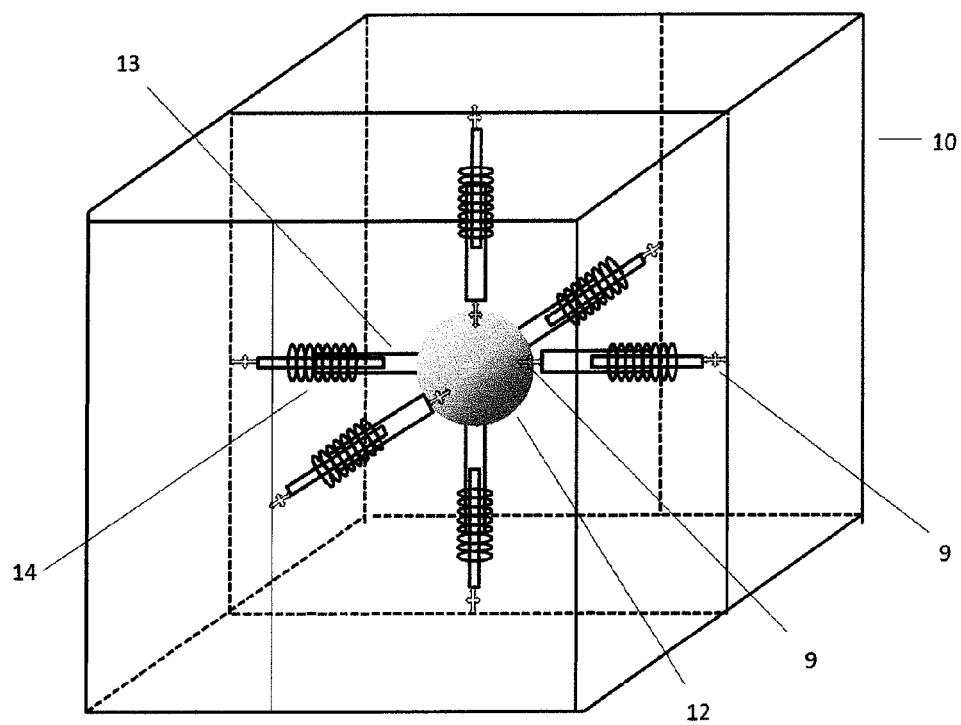
FIG. 4 attached shows a detailed view of the WEC of the invention in the mode employing a spherical mass and six spring-damper sets with a mono-housing to protect the set.

FIG. 4 illustrates a mass-system-damper system making up a mode of WEC according to the invention, with a spherical mass (12) and six spring-damper (14,13) sets with a mono-housing to lodge the set.

The configuration depicted in said FIG. 4 illustrates the degrees of freedom (DOF) of the WEC (70) of the invention in the three translational and the three rotational dimensions obtained from the installation of same in a water vehicle (100, 200) or a floating body (300). In this Figure, the numerals refer to the same items corresponding to those of the preceding Figures and therefore need not be repeated.

FIG. 5 presents the decomposition in the vertical-y and horizontal-x of the orbital motion described by bodies located on the surface and at some depth of a body of water.

FIG. 6 shows a family of curves for different damping factors for the ideal case of a one-dimension dampened harmonic oscillator submitted to an external sine force.

Figure 7A:
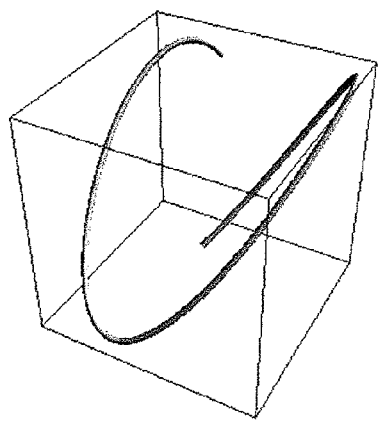
FIG. 7A shows the start of the motion.
Figure 7B:
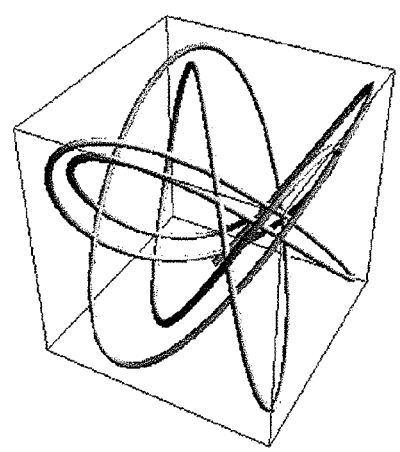
FIG. 7B shows a path after a few seconds the WEC of the invention is operating.

FIG. 7 is a schematic illustration of a kind of path undergone by the mass included in the WEC of the invention which is close to a three-dimension Lissajous figure. FIG. 7A shows the start of the motion. FIG. 7B shows a path after a few seconds the WEC of the invention is operating.

I claim:

1. A Wave Energy Converter (WEC) based on a mass-spring-damper system with different degrees of freedom (DOF), wherein said WEC comprises an inertial oscillating mass-spring-damper system lodged in a housing, said inertial system comprising:
   a) at least one oscillating mass (12),
   b) springs (14), at the ratio of at least two springs (14) for each oscillating mass (12), said springs being arranged radially relative to said oscillating mass (12), and
   c) at least two power take-off (PTO) devices (13) at the ratio of one power take-off energy device (13) for each spring (14), one of the ends of said PTO (13) devices i) being connected radially via universal joints (9) from one end to at least one of said oscillating mass(es) while the other end of said PTO device is connected, also via universal joints (9) to the wall of said housing (10), and ii) channeling said energy to an energy storage conventional system (15), so that the motion of external disturbances including waves and wind upon hitting the system containing said WEC (70) produces oscillations in three translational degrees of freedom and three rotational degrees of freedom which are channeled to said mass-spring-damper, the energy stored in said energy storage (15) being available for utilization.

2. The WEC according to claim 1, wherein mass (12) comprises an empty compartment to be filled in with materials selected among liquids, fluids or grains of any nature for optimized tuning to the frequency of the incident waves.

3. The WEC according to claim 1, wherein said WEC is included in and applied in the motoring of water vehicles (100, 200).

4. The WEC according to claim 3, wherein said WEC comprises one mass (12), one spring (14) and one power take-off (PTO) (13) device.

5. The WEC according to claim 4, wherein said WEC is mounted in a modular structure including containers to be embarked and fixed to a structure of a water vehicle (100, 200).

6. The WEC according to claim 4, wherein the location of WEC (70) in a structure of the water vehicle (100, 200) is any, including the bow, the stern and any intermediary location of the structure of said water vehicle.

7. The WEC according to claim 3, wherein said WEC is mounted in a modular structure including containers to be embarked and fixed to a structure of a water vehicle (100, 200).

8. The WEC according to claim 7, wherein the location of WEC (70) in the structure of the water vehicle (100, 200) is any, including the bow, the stern and any intermediary location of the structure of said water vehicle.

9. The WEC according to claim 3, wherein the location of WEC (70) in a structure of the water vehicle (100, 200) is any, including the bow, the stern and any intermediary location of the structure of said water vehicle.

10. The WEC according to claim 1, wherein said WEC is included in and applied in the total or partial generation of the energy required in water vehicles (100, 200).

11. The WEC according to claim 10, wherein said WEC comprises one mass (12), one spring (14) and one power take-off (PTO) (13) device.

12. The WEC according to claim 10, wherein said WEC is mounted in a modular structure including containers to be embarked and fixed to a structure of a water vehicle (100, 200).

13. The WEC according to claim 10, wherein the location of WEC (70) in a structure of the water vehicle (100, 200) is any, including the bow, the stern and any intermediary location of the structure of said water vehicle.

14. The WEC according to claim 1, wherein said WEC is included in and applied partially in the motoring of water vehicles (100, 200) and partially in the generation of the energy required in said water vehicles.

15. The WEC according to claim 14, wherein said WEC comprises one mass (12), one spring (14) and one power take-off (PTO) (13) device.

16. The WEC according to claim 14, wherein said WEC is mounted in a modular structure including containers to be embarked and fixed to a structure of a water vehicle (100, 200).

17. The WEC according to claim 14, wherein the location of WEC (70) in a structure of the water vehicle (100, 200) is any, including the bow, the stern and any intermediary location of the structure of said water vehicle.

18. The WEC according to claim 1, wherein said WEC is included in and applied to a floating body (300) for the generation of energy.

* * * * *